United States Patent [19]
Otsubo

[11] Patent Number: 6,154,972
[45] Date of Patent: Dec. 5, 2000

[54] MEASURING MACHINE WITH CLEANING DEVICE

[75] Inventor: Seiichi Otsubo, Utsunomiya, Japan

[73] Assignee: Mitutoyo Corporation, Kanagawa-ken, Japan

[21] Appl. No.: 09/338,287

[22] Filed: Jun. 22, 1999

[30] Foreign Application Priority Data

Jul. 16, 1998 [JP] Japan ................................ 10-201957

[51] Int. Cl.⁷ ............................. G01B 5/004; G01B 5/008
[52] U.S. Cl. .................................. 33/503; 33/556; 33/559
[58] Field of Search .......................... 33/503, 504, 556, 33/557, 558, 559, 560, 561, DIG. 2

[56] References Cited

U.S. PATENT DOCUMENTS

| | | | |
|---|---|---|---|
| 5,173,613 | 12/1992 | Henry et al. ........................ | 250/559.19 |
| 5,189,805 | 3/1993 | Matsumoto et al. ..................... | 33/503 |
| 5,189,806 | 3/1993 | McMurtry et al. ...................... | 33/503 |
| 5,291,662 | 3/1994 | Matsumiya et al. ..................... | 33/503 |
| 5,615,489 | 4/1997 | Breyer et al. ............................ | 33/503 |

FOREIGN PATENT DOCUMENTS

| | | | |
|---|---|---|---|
| 31 20 493 A1 | 5/1982 | Germany . | |
| 34 20 139 A1 | 6/1985 | Germany . | |
| 40 21 546 A1 | 1/1992 | Germany . | |
| 43 27 250 A1 | 3/1994 | Germany . | |
| 196 50 284 A1 | 6/1998 | Germany . | |
| 406241766 | 9/1994 | Japan ........................................ | 33/503 |
| 406313710 | 11/1994 | Japan ........................................ | 33/503 |
| 2 100 441 | 12/1982 | United Kingdom . | |

*Primary Examiner*—Diego Gutierrez
*Assistant Examiner*—F. Francis
*Attorney, Agent, or Firm*—Frishauf, Holtz, Goodman, Langer & Chick, P.C.

[57] ABSTRACT

A measuring machine includes a probe mounting portion, a probe mounted on the probe mounting portion, for contacting a measuring surface of a workpiece, and a detector for detecting an amount of displacement of the probe as the probe moves in contact with the measuring surface of the workpiece. A cleaning device is provided at the probe mounting portion, with a nozzle for ejecting gas upon the measuring surface of the workpiece when the probe is positioned close to the measuring surface. A rotative driving device is provided for rotatively driving the cleaning device about the probe.

11 Claims, 3 Drawing Sheets

MEASURING MACHINE WITH CLEANING DEVICE

BACKGROUND OF THE INVENTION

1. Field of the Invention

The present invention relates to a measuring machine with a cleaning device, and more particularly to a measuring machine having a probe such as a three dimensional coordinate measuring machine, which is provided with a cleaning device for cleaning a workpiece to be measured by the probe and its vicinity.

2. Prior Art

A three dimensional coordinate measuring machine in general is comprised of a stand, a table horizontally mounted on the stand, and a column erected on the stand and movable in a horizontal direction. The column is provided with a saddle movable in a direction which is orthogonal in a horizontal plane to the moving direction of the column. A detector is provided on the saddle for vertical sliding movement.

The detector is comprised of a spindle mounted on the body of the detector for vertical sliding movement together with the body, and a probe mounted on the spindle.

The three dimensional coordinate measuring machine constructed as above operates such that the probe is moved relative to a workpiece placed on the table, in three directions, i.e. X-axis, Y-axis and Z-axis directions according to necessity, to detect coordinates of the workpiece to thereby perform measurement of the workpiece.

If a measuring surface of the workpiece has dust, chips or the like attached thereon, accurate measurement cannot be performed, resulting in a measurement error. To avoid this, it is necessary to clean the workpiece just before starting measurement.

To meet this requirement, conventionally a workpiece cleaning device has been provided, which is used such that the entire workpiece is dipped in a liquid cleaning agent of the cleaning device or high-pressure air is ejected upon the workpiece so as to remove dust, chips or the like attached on the workpiece, before the start of measurement. In some cases, measurement is carried out without previous cleaning of the workpiece.

According to the conventional workpiece cleaning device, however, in measuring a workpiece, the workpiece once cleaned is removed from the cleaning device, and then placed onto a predetermined portion of the measuring machine. Therefore, fine dust or the like can be attached to the workpiece in the course of removal and placement of the workpiece, thus providing a possibility of a measurement error. As a result, there can occur a case that even after the workpiece is cleaned, placed onto the predetermined portion of the measuring machine, and then measured, the measurement result shows an abnormal value, requiring the workpiece to be again cleaned to remove from the workpiece an alien substance such as dust which is expected to be attached to the workpiece. This takes cost and time, and degrades the working efficiency as well as the reliability of measurement accuracy. Moreover, since the provision of the separate workpiece cleaning device incurs an increased cost. Besides, an operator has to always monitor the operation of the cleaning device, which forms a bar to realization of unmanned measurement.

SUMMARY OF THE INVENTION

It is therefore an object of the present invention to provide a measuring machine with a cleaning device which is capable of always securing a clean measuring surface of a workpiece to be measured, thus being free from a measurement error and hence enhancing the measurement reliability.

To attain the above object, the present invention provides a measuring machine including a probe mounting portion, a probe having an axis and mounted on the probe mounting portion, for contacting a measuring surface of a workpiece, and a detector for detecting an amount of displacement of the probe as the probe moves in contact with the measuring surface of the workpiece, comprising a cleaning device provided at the probe mounting portion, the cleaning device having a nozzle for ejecting gas upon the measuring surface of the workpiece when the probe is positioned close to the measuring surface, and rotative driving means for rotatively driving the cleaning device about the probe.

With the above arrangement according to the present invention, the measuring surface of the workpiece is cleaned by gas ejected from the nozzle of the cleaning device just before measurement by the probe, whereby dust, chips, and the like can be blown off the measuring surface. Further, the cleaning device can be rotatively driven so as to direct the nozzle toward an optimal position for cleaning. As a result, the measuring surface of the workpiece can be always kept clean, eliminating a measurement error and hence enhancing the measuring reliability.

The rotative driving means may be adapted to rotate the cleaning device through an angle smaller than 360 degrees or one rotation. Further, the rotative driving means is adapted to rotate the cleaning device only in one direction, but it may be adapted to rotate the latter in two directions if required. The rotative driving means may have any structure. For example, the rotative driving means may comprise a first gear member provided at the probe mounting portion and movable about the probe, a second gear member meshing with the first gear member, and a motor for rotatively driving the second gear member. More specifically, the second gear member may be a pinion drivenly secured to a main shaft of the motor as a stationary member, and the first gear member may be an external spur gear or an internal spur gear provided on the cleaning device side. The rotative driving means may be a roller type for rotatively driving the cleaning device. The gas ejected from the nozzle of the cleaning device is preferably high-pressure air, but it may be another kind of gas insofar as it is odorless and non-noxious. The rotation of the cleaning device may be automatically made by a command from a controller of the measuring machine. Measuring machines on which the cleaning device according to the present invention can be mounted are any types of measuring machines insofar as they have probes, including three dimensional coordinate measuring machines, and shape measuring machines. Further, the cleaning device according to the present invention may be mounted on robots and the like.

In a preferred form of the present invention, the cleaning device comprises a mounting member provided at the probe mounting portion and movable about the probe, an arm provided at the mounting member, the nozzle being mounted on the arm, and ejection angle adjusting means for adjusting an angle of ejection of gas from the nozzle to a desired angle.

With this arrangement according to the present invention, the gas ejection angle of the nozzle can be adjusted to any desired angle. As a result, the measuring machine according to the present invention can be adapted to various shapes of measuring surfaces by varying the gas ejection angle of the nozzle, enabling gas cleaning with the nozzle in an optimal position for cleaning, whereby it is possible to prevent any substantial measurement error and hence enhance the measuring reliability.

In the above arrangement, the angle between the nozzle and the arm may be variable, or the angle between the arm and the mounting member may be variable.

For example, it is advantageous that the ejection angle adjusting means comprises a shaft provided at the mounting member at an outer periphery thereof and movable about an axis thereof, a first gear member secured to the shaft, a second gear member meshing with the first gear member, and a motor for rotatively driving the second gear member.

Also, it is preferable that the cleaning device is detachably mounted on the probe mounting portion.

With this arrangement, since the cleaning device can be mounted or dismounted onto or from the probe mounting portion, it can be removed from the probe mounting portion, i.e. the measuring machine body, for storage or maintenance, to thereby facilitate storage and maintenance of the cleaning device.

It is particularly advantageous to apply the measuring machine according to the present invention to a three dimensional coordinate measuring machine having the probe movable in three directions including a first direction in a horizontal plane (X-axis direction), a second direction (Y-axis direction) orthogonal in the horizontal plane to the first direction, and a third direction (Z-axis direction) orthogonal in a vertical plane to the first and second directions.

When the measuring machine according to the present invention is applied to a three dimensional coordinate measuring machine as mentioned above, the measuring surface of the workpiece can be always kept clean, eliminating a measurement error and hence enhancing the measuring reliability. Further, if the cleaning device is connected to a controller of the three dimensional coordinate measuring machine, the cleaning device can be operated by a command from the controller, making it unnecessary for an operator to always monitor the operation of the cleaning device, and hence making it possible to realize unmanned measurement.

The above and other objects, feature, and advantages of the invention will become more apparent from the following detailed description taken in conjunction with the accompanying drawings.

DETAILED DESCRIPTION OF PREFERRED EMBODIMENT

The present invention will be described in detail with reference to the accompanying drawings showing a preferred embodiment thereof.

Figure 1:
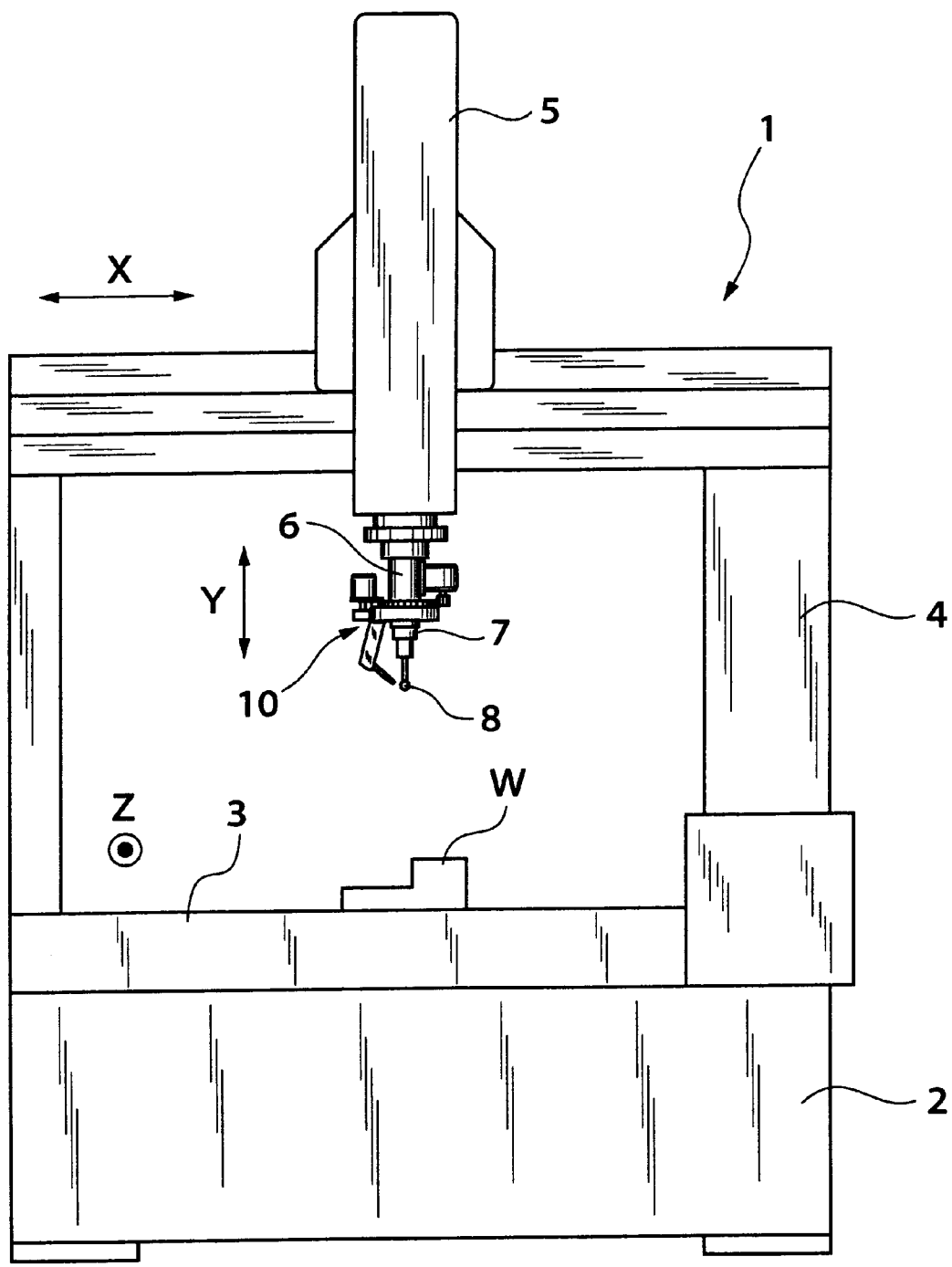
FIG. 1 is a front view showing the whole construction of a measuring machine with a cleaning device according to one embodiment of the present invention.
Figure 2:
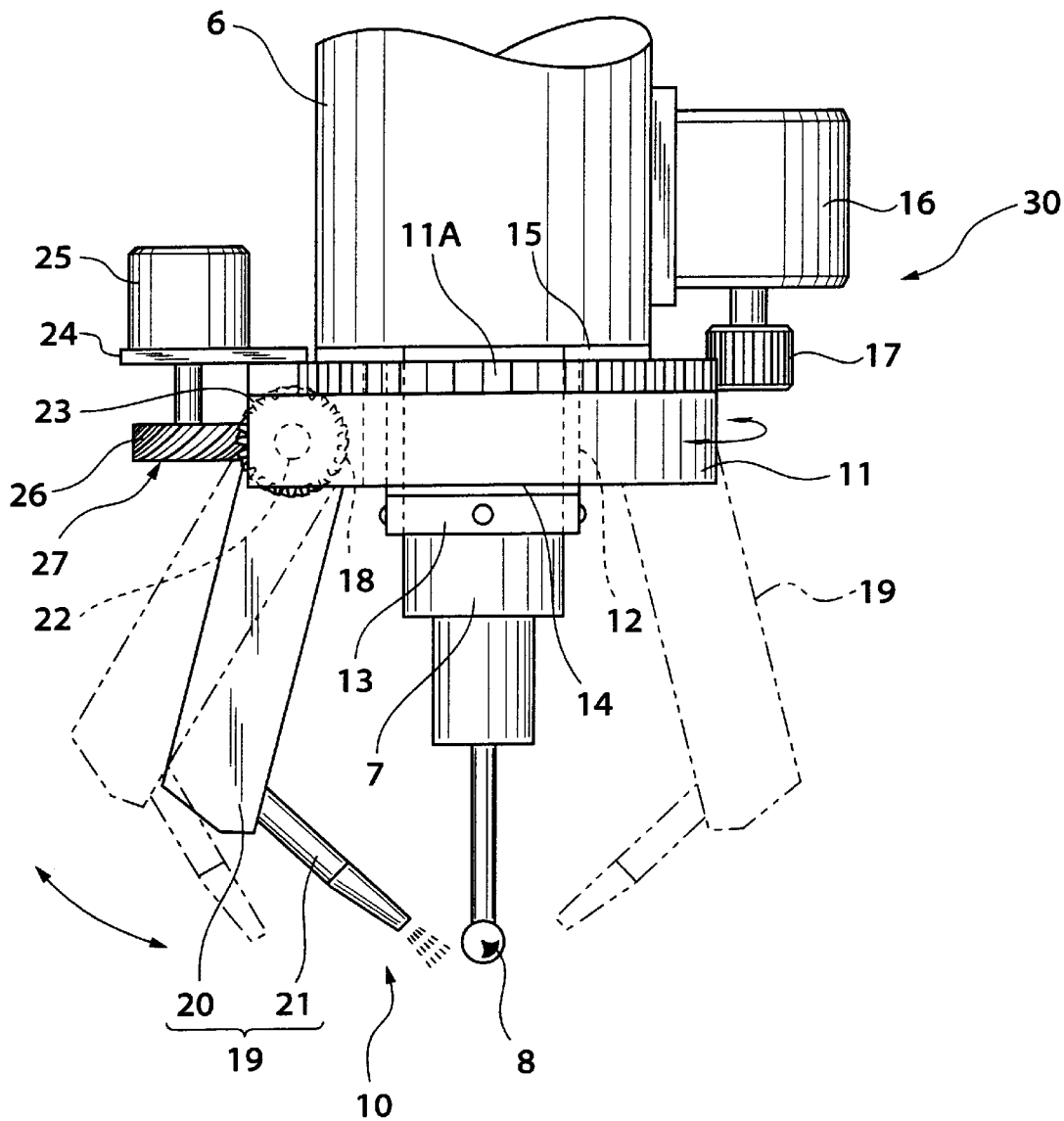
FIG. 2 is a view showing, on an enlarged scale, the construction of the cleaning device in FIG. 1, mounted on a spindle.

FIG. 1 shows the whole construction of a measuring machine with a cleaning device according to one embodiment of the present invention, and FIG. 2 shows details of the construction of the cleaning device mounted on a spindle. The measuring machine according to the present embodiment is applied to a three dimensional coordinate measuring machine 1 which has a spindle movable in three directions, i.e. X-axis, Y-axis, and Z-axis directions.

The measuring machine 1 has a stand 2, on which is horizontally mounted a table 3 for supporting a workpiece W to be measured. A column 4 is erected on the stand 2, which is horizontally movable in a direction orthogonal to space (Z-axis direction). A saddle 5 is provided on the column 4, for movement in a horizontal direction (X-axis direction) which is orthogonal to the Z-axis direction. The saddle 5 carries a detector 6 which is mounted on the saddle 5 via a ball screw or the like, not shown, for sliding in a vertical direction (Z-axis direction or detecting direction) which is orthogonal to the upper surface of the table 3. A spindle 7 is mounted on the body of the detector 6 in concentricity therewith, for vertical sliding movement together with the body, and a probe 8 is mounted on a tip end of the spindle 7.

A cleaning device 10 is provided on a tip end of the detector 6 at a location in the vicinity of the spindle 7, which cleans a measuring surface of the workpiece W which is located near the probe 8. Provided on the outer periphery of the detector 6 with the spindle 7 mounted thereon is a rotative driving device 30 for horizontally rotating the cleaning device 10 about the axis of the detector 6, i.e. about the probe 8. The rotative driving device 30 is adapted to rotate the cleaning device 10 through an angle smaller than 360 degrees or one rotation, at the maximum. Further, the rotative driving device 30 is adapted to rotate the cleaning device 10 only in one horizontal direction, but it may be adapted to rotate the latter in two horizontal directions if required.

As better shown in FIG. 2, the cleaning device 10 has a tubular mounting member (gear member) 11 which is detachably mounted on the spindle 7. The mounting member 11 is rotatable about the axis of the detector 6 or the probe 8 and has its inner periphery fitted on the spindle 7 via a bush 12. A lower end of the mounting member 11 is supported by an annular support member 13 which is in turn secured to the spindle by machine screws or the like. Slip members 14 and 15 formed of resin are interposed between the support member 13 and the mounting member 11 and between the spindle 7 and the mounting member 11 to allow smooth rotation of the mounting member 11.

An upper portion of the mounting member 11 has its entire outer periphery formed with a toothed portion 11A serving as an external spur gear.

On the other hand, a motor 16 is attached to the outer periphery of the detector 6 with the spindle 7 mounted thereon at a level above the mounting member 11. A pinion (gear member) 17 is secured on a main shaft of the motor 16. The pinion 17 is in mesh with the toothed portion or external spur gear 11A of the mounting member 11 such that the entire mounting member 11 including the toothed portion 11A is rotated through the meshing gear 11A and pinion 17 as the motor 16 rotates. The motor 16, the mounting member 11, and the pinion 17 constitute the rotative driving device 30.

The motor 16 of the rotative driving device 30 receives a command from a controller, not shown, of the measuring machine 1 such that the motor 16 is rotatively driven in response to the command, thereby rotating the mounting member 11 in an automatic manner.

Formed in a part of the outer periphery of the mounting member 11 is a recess 18 in which is mounted a base end of an arm 20 of an air jet device 19 for blowing or ejecting high-pressure air. An air nozzle 21 is attached to a tip end of the arm 20 in such a fashion as to exhibit a generally L-shaped configuration together with the arm 20. The unit of the arm 20 and the air nozzle 21 is controlled in position by a tilting mechanism 27, referred to later, such that a tip end of the nozzle 21 is directed toward the probe 8 or its vicinity to eject high-pressure air and clean the measuring portion of the workpiece W with the air nozzle 21 in an optimal position for cleaning when the measuring machine 1 is in operation.

A hose or a like conduit is connected from air supply means, not shown, to the air jet device 19 to supply high-pressure air to the same.

The air jet device 19 constructed as above is tiltable in a vertical plane by the tilting mechanism 27. More specifically, the base end of the arm 20 is secured on a shaft 22 which is horizontally bridged between opposed walls of the recess 18 and rotatable about its own axis and on which a first helical gear (gear member) 23 is secured. On the other hand, a motor 25 is mounted via a support plate 24 on an upper surface of the toothed portion 11A of the mounting member 11, with a second helical gear (gear member) 26 secured on a main shaft of the motor 25. The first and second helical gears 23, 26 are in mesh with each other such that the shaft 22 is rotated about its own axis through the meshing gears 23, 26 as the motor rotates 25, and hence the arm 20 is tilted. Accordingly, the tip end of the air nozzle 21 can be tilted toward or away from the probe 8, thus making it possible to adjust the air ejection angle to any desired angle.

The motor 25 of the tilting mechanism 27 receives a command from the controller, not shown, of the measuring machine 1 such that the motor 25 is rotatively driven in response to the command, thereby rotating the arm 20 in an automatic manner. The tilting mechanism 27 is rotated about the axis of the detector 6 as the mounting member 11 is rotated by the rotative driving device 30, but the angle of rotation of the tilting mechanism 27 is limited to such a range that the tilting mechanism 27 does not interfere with the pinion 17.

The motor 25 and the first and second helical gears 23, 26 constitute the tilting mechanism 27, and the tilting mechanism 27, the mounting member 11, the air jet device 19 formed by the arm 20 and the air nozzle 21, the shaft 22, and the support member 13 constitute the cleaning device 10.

The positional relationship between the air jet device 19, particularly the air nozzle 21, the probe 8, and the workpiece W will be explained with reference to FIGS. 3A to 3C.

Figure 3A:
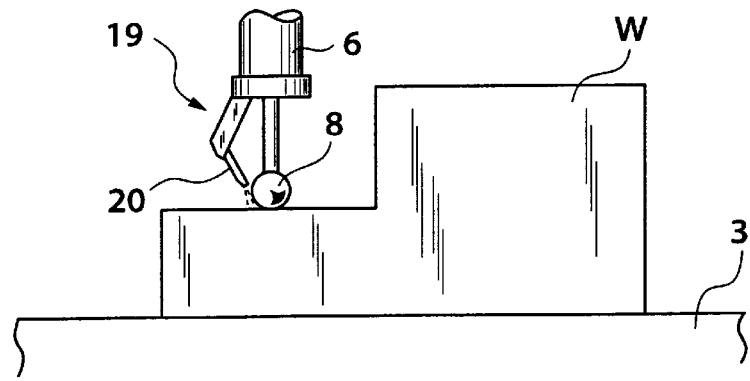
FIG. 3A is a view showing, by way of example, the positional relationship between the cleaning device and a measuring surface of a workpiece which is a bottom surface of a stepped shoulder portion of the workpiece.

As shown in FIG. 3A, in measuring the bottom surface of a stepped shoulder of a workpiece W, there is a possibility that particularly the arm 20 of the air jet device 19 strikes upon a vertical wall of the stepped shoulder to impede perfect air ejection. Therefore, the rotative driving device 30 is operated to rotate the cleaning device 10 via the mounting member 11 so that the air nozzle 21 is moved to a side of the probe 8 remote from the vertical wall, and then high-pressure air is caused to be ejected through the air nozzle 21 of the cleaning device 10.

Figure 3B:
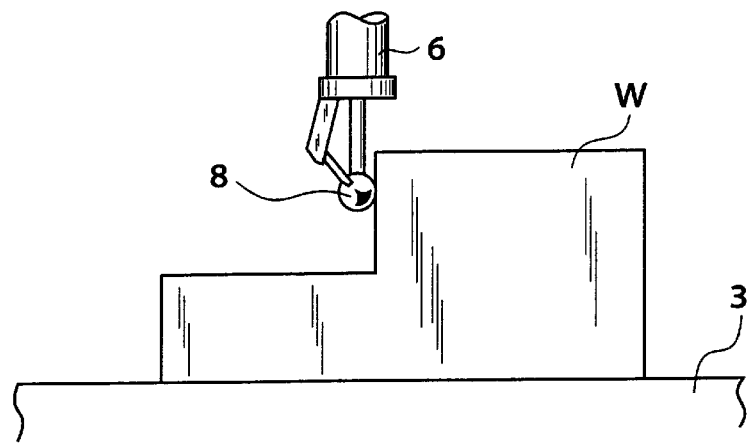
FIG. 3B is a view showing, by way of example, the positional relationship between the cleaning device and a measuring surface of the workpiece which is a vertical wall of the stepped shoulder portion.

As shown in FIG. 3B, in measuring the vertical wall of the stepped shoulder of the workpiece W, there is a possibility that particularly the arm 20 strikes upon the vertical wall of the stepped shoulder to impede perfect air ejection. Therefore, the rotative driving device 30 is operated to rotate the cleaning device 10 via the mounting member 11 so that the air nozzle 21 is moved to a side of the probe 8 remote from the vertical wall, and then high-pressure air is caused to be ejected toward the vertical wall through the air nozzle 21.

Figure 3C:
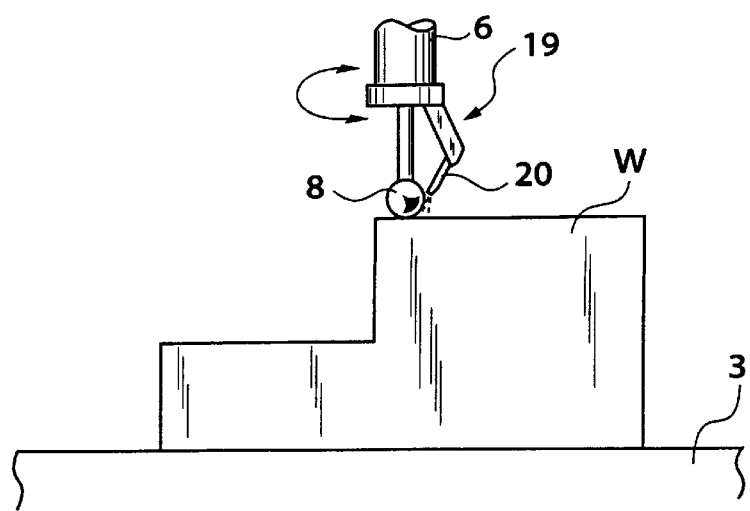
FIG. 3C is a view showing, by way of example, the positional relationship between the cleaning device and a measuring surface of the workpiece which is an upper surface of the stepped shoulder portion.

As shown in FIG. 3C, in measuring an upper surface of the stepped shoulder, there is a possibility that air is struck upon the vertical wall if particularly the arm 20 of the air jet device 19 is positioned at a location near the vertical wall to impede perfect air ejection. Therefore, the air nozzle 20 is moved to a side of the probe 8 remote from the vertical wall, and then high-pressure air is caused to be ejected toward the vertical wall.

Next, the operation of the measuring machine according to the present embodiment constructed above will be described.

To carry out measurement of a workpiece W by the probe 8 of the measuring machine 1, first, the rotative driving device 30 including the motor 16 is mounted onto the outer periphery of the detector 6. Then, the mounting member 11 with the air jet device 19 mounted thereon in advance is mounted onto the spindle 7 by fitting and sliding the former on the latter from the side of the probe 8, followed by fitting and sliding the support member 13 on the spindle 7 from the side of the probe 8 and securing the former to the latter by machine screws or the like in such a manner that the support member 13 supports the mounting member 11. On this occasion, the pinion 17 and the toothed portion 11A of the mounting member 11 are previously brought into perfect mesh with each other, with the arm 20 and air nozzle 21 positioned at a location remote from the probe 8.

In measuring the workpiece W, the cleaning device 10 is angularly moved or rotated about the detector 6 into such an optimal position that the arm 20 and air nozzle 21 do not hinder the probe 8 from contacting the measuring surface of the workpiece W and at the same time the measuring surface located in the vicinity of the probe 8 can be efficiently cleaned. With the position of the arm 20 and air nozzle 21 thus set, high-pressure air is caused to be ejected through the air nozzle 21 to clean the workpiece measuring surface in the vicinity of the probe 8, and then the probe 8 is brought into contact with the workpiece W to carry out desired measurement by detecting an amount of displacement of the probe 8 as it is moved on the measuring surface.

The measuring machine according to the present embodiment constructed as above can provide the following results:

a) Since the measuring surface of the workpiece W is cleaned by high-pressure air ejected from the air nozzle 21 just before the measurement by the probe 8, measurement can be achieved with the measuring surface being always free of dust, chips, etc., to thereby eliminate the measurement error and enhance the measuring reliability.

b) Since the arm 20 of the air jet device 19 is tiltable so as to allow adjustment of the angle of orientation of the air nozzle 21, i.e. the air ejection angle, any complicated measuring surfaces can be easily cleaned by the air nozzle set in an optimal position, to thereby achieve measurement with the measuring surface being always free of dust, chips, etc. As a result, a measurement error can be substantially eliminated, leading to enhanced measuring reliability.

c) Since the cleaning device 10 can be detachably mounted on the body of the measuring machine 1, it can in be removed from the measuring machine body for storage or maintenance, to thereby facilitate storage and maintenance of the cleaning device 10.

d) Since the bush 12 is provided at the inner periphery of the cleaning device 10 and the slip members 15, 14 on the upper and lower surfaces of the same, the cleaning device 10 can be smoothly rotated, thereby preventing an excessive load upon the motor 16 of the rotative driving device 30.

e) To mount or dismount the cleaning device 10 onto or from the measuring machine body, it suffices to fit the mounting member 11 with the air jet device 19, tilting mechanism 27 and others mounted thereon in advance, onto the spindle 7, then fit the support member 13 onto the spindle 7 and secure the former to the latter, or vice versa. Therefore, the mounting and dismounting operations can be carried out with ease.

f) Since cleaning of the workpiece W can be made by the cleaning device 10 mounted on the measuring machine body, it is no more necessary to provide a separate cleaning device as in the prior art, thereby enabling large curtailment of the cost.

The present invention is not limited to the above described embodiment, but may be modified or varied to, attain the object, without departing from the scope and spirit of the appended claims.

For example, although in the above described embodiment tilting of the arm 20 is made by a pair of helical gears 23, 26, this is not limitative, but the tilting mechanism may be any other type insofar as it can tilt the arm 20 to a desired position, such as a type using a worm and a worm gear, and a type using a hydraulic or pneumatic cylinder.

Further, although in the above described embodiment rotative driving means using the pinion 17 and the external spur gear in meshing engagement is employed to rotate the mounting member 11, i.e. the cleaning device 10, this is not limitative, but the rotative driving means may be a type using the pinion 17 and an internal spur gear in meshing engagement, for example.

What is claimed is:

1. A measuring machine including a probe mounting portion, a probe having an axis and mounted on said probe mounting portion for contacting a measuring surface of a workpiece, and a detector connected to the probe mounting portion for detecting an amount of displacement of said probe as said probe moves in contact with the measuring surface of the workpiece, comprising:

a cleaning device provided at said probe mounting portion, said cleaning device having a nozzle for ejecting gas upon the measuring surface of the workpiece when said probe is positioned close to the measuring surface; and rotative driving means connected to the probe mounting portion for rotatively driving said cleaning device about said probe.

2. A measuring machine as claimed in claim 1, wherein said cleaning device comprises a mounting member provided at said probe mounting portion and movable about said probe, an arm provided at said mounting member, said nozzle being mounted on said arm, and ejection angle adjusting means connected to the probe mounting portion for adjusting an angle of ejection of gas from said nozzle to a desired angle.

3. A measuring machine as claimed in claim 2, wherein said ejection angle adjusting means comprises a shaft provided at said mounting member at an outer periphery thereof and movable about an axis thereof, a first gear member secured to said shaft, a second gear member meshing with said first gear member, and a motor for rotatively driving said second gear member.

4. A measuring machine as claimed in claim 3, wherein said measuring machine is a three dimensional coordinate measuring machine having said probe movable in three directions including a first direction in a horizontal plane, a second direction orthogonal in said horizontal plane to said first direction, and a third direction orthogonal in a vertical plane to said first and second directions.

5. A measuring machine as claimed in claim 2, wherein said cleaning device is detachably mounted on said probe mounting portion.

6. A measuring machine as claimed in claim 2, wherein said measuring machine is a three dimensional coordinate measuring machine having said probe movable in three directions including a first direction in a horizontal plane, a second direction orthogonal in said horizontal plane to said first direction, and a third direction orthogonal in a vertical plane to said first and second directions.

7. A measuring machine as claimed in claim 1, wherein said cleaning device is detachably mounted on said probe-mounting portion.

8. A measuring machine as claimed in claim 7, wherein said measuring machine is a three dimensional coordinate measuring machine having said probe movable in three directions including a first direction in a horizontal plane, a second direction orthogonal in said horizontal plane to said first direction, and a third direction orthogonal in a vertical plane to said first and second directions.

9. A measuring machine as claimed in claim 1, wherein said rotative driving means comprises a first gear member provided at said probe mounting portion and movable about said probe, a second gear member meshing with said first gear member, and a motor for rotatively driving said second gear member.

10. A measuring machine as claimed in claim 9, wherein said measuring machine is a three dimensional coordinate measuring machine having said probe movable in three directions including a first direction in a horizontal plane, a second direction orthogonal in said horizontal plane to said first direction, and a third direction orthogonal in a vertical plane to said first and second directions.

11. A measuring machine as claimed in claim 1, wherein said measuring machine is a three dimensional coordinate measuring machine having said probe movable in three directions including a first direction in a horizontal plane, a second direction orthogonal in said horizontal plane to said first direction, and a third direction orthogonal in a vertical plane to said first and second directions.

* * * * *